United States Patent
Dahl et al.

(10) Patent No.: US 9,469,695 B2
(45) Date of Patent: Oct. 18, 2016

(54) METHOD TO PRODUCT MICROCELLULOSE

(75) Inventors: Olli Dahl, Tervakoski (FI); Kari Vanhatalo, Helsinki (FI); Kari Parviainen, Espoo (FI)

(73) Assignee: AALTO UNIVERSITY FOUNDATION, Aalto (FI)

( * ) Notice: Subject to any disclaimer, the term of this patent is extended or adjusted under 35 U.S.C. 154(b) by 0 days.

(21) Appl. No.: 13/697,718

(22) PCT Filed: Jun. 7, 2011

(86) PCT No.: PCT/FI2011/050526
§ 371 (c)(1),
(2), (4) Date: Jan. 4, 2013

(87) PCT Pub. No.: WO2011/154600
PCT Pub. Date: Dec. 15, 2011

(65) Prior Publication Data
US 2013/0203981 A1  Aug. 8, 2013

(30) Foreign Application Priority Data
Jun. 7, 2010 (FI) .................................. 20105642

(51) Int. Cl.
*D21C 9/00* (2006.01)
*D21C 11/00* (2006.01)
*C08B 15/02* (2006.01)

(52) U.S. Cl.
CPC .............. *C08B 15/02* (2013.01); *D21C 9/002* (2013.01); *D21C 9/004* (2013.01); *D21C 11/0007* (2013.01)

(58) Field of Classification Search
CPC ...... D21C 9/001; D21C 9/002; D21C 9/007; C08B 15/02; C08B 3/24

USPC ............................ 127/37; 162/157.7; 536/56
See application file for complete search history.

(56) References Cited

U.S. PATENT DOCUMENTS 3,954,727 A   5/1976 Toshkov et al.
4,053,352 A * 10/1977 Hultman et al. ................. 162/29
(Continued)

FOREIGN PATENT DOCUMENTS

WO       9915564 A1    4/1999
WO   WO 2004088032 A2 * 10/2004 ............. C11B 13/02

OTHER PUBLICATIONS

Smook, Handbook for Pulp and Paper Technologists, 1992, Angus Wilde Publications, 2nd edition, chapter 13.*

(Continued)

*Primary Examiner* — Anthony Calandra
(74) *Attorney, Agent, or Firm* — Thomas Horstemeyer, LLP

(57) ABSTRACT

The present invention relates to a process for producing microcellulose comprising hydrolyzing fibrous cellulosic material with an acid at an elevated temperature or acidifying fibrous cellulosic material followed by washing and hydrolyzing the washed cellulosic material at an elevated temperature to produce a microcellulose-hydrolysate mixture followed by separation of the microcellulose from the hydrolysate, wherein the mixture or separated hydrolysate or microcellulose is optionally neutralized, and wherein the microcellulose production is integrated to production of a pulp mill such that at least part of chemicals used in the acidification, acid hydrolysis and/or neutralization is produced by an integrated chemical recovery process of the pulp mill.

37 Claims, 4 Drawing Sheets

(56) References Cited

U.S. PATENT DOCUMENTS

| | | | |
|---|---|---|---|
| 4,174,997 A * | 11/1979 | Richter | 162/19 |
| 4,241,041 A * | 12/1980 | Farin | B01D 53/501 162/36 |
| 4,299,652 A | 11/1981 | Masuno et al. | |
| 5,820,830 A * | 10/1998 | McIlroy et al. | 422/168 |
| 6,228,213 B1 * | 5/2001 | Hanna et al. | 162/18 |
| 7,005,514 B2 * | 2/2006 | Nguyen | 536/56 |
| 7,037,405 B2 * | 5/2006 | Nguyen et al. | 162/25 |
| 2004/0074615 A1 | 4/2004 | Nguyen | |
| 2006/0144535 A1 * | 7/2006 | Nguyen | D21C 9/004 162/103 |
| 2007/0034344 A1 * | 2/2007 | Reilama | D21C 11/08 162/51 |

OTHER PUBLICATIONS

Smook, Handbook for Pulp and Paper Technologists, 1992, Angus Wilde Publications, 2nd edition, chapter 10.*

Gullichsen editor, Chemical Pulping 6A, 1999, Fapet Oy,p. A616-A665.*

Rydholm, "Pulping Process", Interscience Publishers, 1965, pp. 649-672.

International Search Report and Written Opinion date Dec. 1'6, 2011.

International Preliminary Report on Patentability dated Aug. 22, 2012.

Finnish Search Report dated Mar. 29, 2011.

* cited by examiner

METHOD TO PRODUCT MICROCELLULOSE

CROSS REFERENCE TO RELATED APPLICATION

This application is the 35 U.S.C. §371 national stage of PCT application entitled "A Novel Method to Produce Microcellulose," having serial number PCT/FI2011/050526, filed on 7 Jun. 2011, which claims priority to Finland Application No. 20105642, filing date Jun. 7, 2010, which is incorporated by reference in its entirety.

FIELD OF THE INVENTION

The present invention relates to an improved process for preparing microcellulose with an acid hydrolysis at an elevated temperature or with an acidification followed by washing and hydrolysis at an elevated temperature, wherein the microcellulose production is integrated to production of a pulp mill.

BACKGROUND OF THE INVENTION

Microcellulose (also named as e.g. level-off DP cellulose and micro crystalline cellulose) is a versatile product in many industrial applications, e.g. in food, pharmaceutical, cosmetics, paper and board and many other applications. Microcellulose can also be used in the production of derivatives of microcellulose, such as viscose cellulose, CMC, nanocellulose and various composite products.

Several methods have been proposed in the patent literature for producing microcellulose.

U.S. Pat. No. 2,978,446 describes the production of level-off DP (degree of polymerization) cellulose by acid hydrolysis and mechanical treatment. Cellulose is hydrolyzed with boiling in 2.5 normal hydrochloric acid (HCl). Acid concentration is thus 9% and temperature about 105° C. The consistency of the pulp and the amount of added acid are not specified. The method requires subsequent to acid hydrolysis vigorous mechanical disintegration in aqueous medium. It is obvious that high dosage of acid and extensive mechanical treatment have prevented the development of any reasonable production economy.

U.S. Pat. No. 3,278,519 describes a similar method for producing level-off DP cellulose by hydrolyzing cellulose either with 2.5 normal HCl at 105° C. or with 0.5% HCl at 250° F. (121° C.). The consistency of the pulp and the amount of added acid are not specified. This method also describes a harsh energy-consuming mechanical treatment.

U.S. Pat. No. 3,954,727 discloses a method for producing microcrystalline cellulose by hydrolyzing cellulose with dilute sulphuric acid at a temperature of from 120 to 160° C. The dilute sulphuric acid to which the cellulose is added has a concentration of 1% and the cellulose-acid mass has a concentration of 5%. Thus, the consistency of the pulp is low, the heating demand is therefore high and the amount of acid based on the dry weight of the cellulose becomes high. This makes the process more expensive and more complicated.

U.S. Pat. No. 7,037,405 describes a method, in which raw pulp material is contacted with acid and heated at elevated temperature and then treated mechanically. A suitable acid concentration is mentioned to be 1-5% of the mixture, a suitable pulp consistency 3-50%, a suitable temperature range 80-120° C. and a suitable reaction time 30 min-4 h. After acid hydrolysis the pulp mixture is treated mechanically for disintegration of the fibres. Preferably the mechanical disintegration process step shears the crystalline cellulose particles into micron size ranging form about 1 to 10 micron size. The process of U.S. Pat. No. 7,037,405 suffers of complicated production process. Mechanical disintegration step is required after acid hydrolysis. This stage requires in production costly refiner unit and high refining energy of 5-100 kWh/ton.

U.S. Pat. No. 6,228,213 discloses a process for producing microcrystalline cellulose by adding an acid solution to cellulose and feeding the cellulose and acid solution through an extruder, wherein the cellulose undergoes acid hydrolysis and forms microcrystalline cellulose. The temperature of the extruder barrel during the hydrolysis is from 80 to 200° C. Due to the temperature of the extruder and the pressure created by the die or screw of the extruder, the cellulose melts in the extruder, which allows for more intimate contact between the cellulose and the acid. The compression ratio of the extruder screw is between 1.5:1 and 3:1, preferably about 3:1. Disadvantages with extruders are that they are expensive, the maintenance costs are rather high, and they require a high mechanical energy input, by estimation about 150 kWh or over per dry ton cellulose.

U.S. Pat. No. 5,543,511 describes the production of level-off-DP cellulose using partial hydrolysis with oxygen and/or carbon dioxide at 100-200° C.

U.S. Pat. No. 4,427,778 describes the production of level-off-DP cellulose by enzymatic hydrolysis.

Acid hydrolysis is also used in the dissolving pulp production, e.g. in acidic bisulphite cooking and as a prehydrolysis step in the kraft process. Acidic bisulphite cooking is described in e.g. Rydholm, S. E., Pulping Processes, pp. 649 to 672. U.S. Pat. No. 5,589,033 describes a prehydrolysis kraft process of lignin-containing cellulosic material (i.e. wood chips) at 100-160° C. for softwoods and at 120-180° C. for hardwoods for 10-200 min. Neutralization and alkaline kraft cooking follows the pre-hydrolysis step. The final product is a pulp with high alpha cellulose purity and can be used as dissolving pulp. Dissolving pulp has a fibrous structure with fiber length of typically 0.5 mm to 2.5 mm dependent on wood raw material. Thus, the physical dimensions are much larger than microcellulose.

In the prior-art microcellulose manufacturing processes high amounts of chemicals such as acids and neutralization chemicals are used.

Chemical recovery of kraft pulp mills are based on converting sodium and sulfur into active cooking chemicals by a multi-step recovery process including black liquor evaporation, recovery boiler and causticizing steps. The dissolved substances are burned in a recovery boiler whereby also energy is produced. The recovered active cooking chemicals are in sodium hydroxide and sodium sulfide or sodium hydrogen sulfide form Balancing the ratio of sodium and sulfur is very essential in these recovery processes. Typically chemical recovery systems of softwood kraft pulp mills experience an excess of sulfur and therefore have a challenge to bleed out sulfur from the closed cycle. Sulfur removal can take place by taking out glauber salt (i.e. sodium sulfate salt) from recovery boiler. The problem here is that also sodium will simultaneously be removed and therefore this alternative is inefficient and expensive as addition sodium (e.g. in form of make-up caustic, NaOH) needs to be added to the recovery cycle.

In view of the above described processes for producing microcellulose there is a need for an even more efficient and economical process. In addition, the kraft pulp mills have a need to better balance the sodium-sulfur ratio.

SUMMARY OF THE INVENTION

According to the present invention it was surprisingly found that microcellulose can be produced from fibrous cellulosic material by acid hydrolysis at a high consistency of at least 8% and temperature of at least 80° C. wherein at least part of the chemical aspects of the manufacturing process are integrated to a kraft pulp mill. The particle size distribution can be easily controlled by varying the conditions of the mild acid hydrolysis.

DETAILED DESCRIPTION OF THE INVENTION

Figure 1:
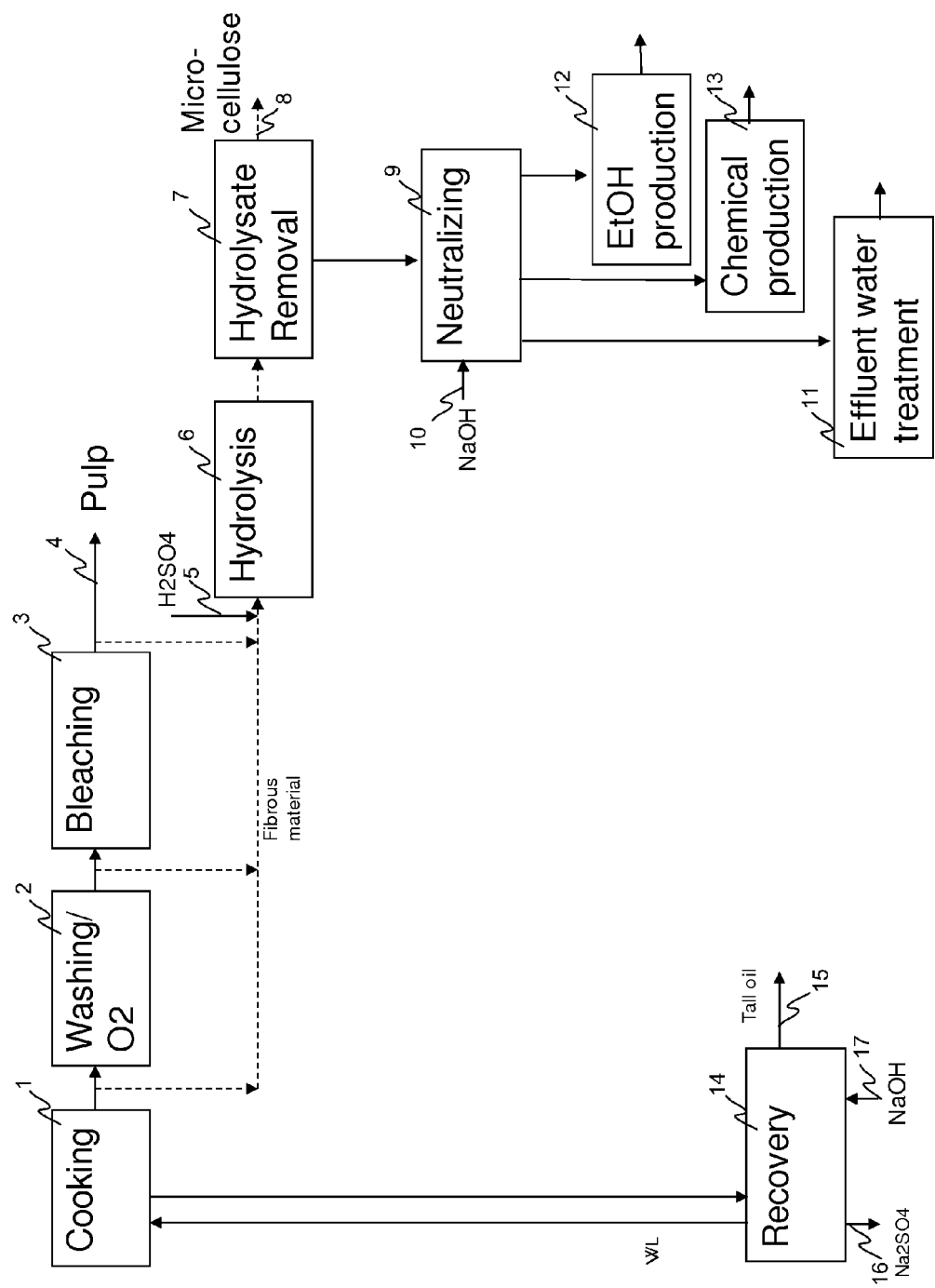
FIG. 1 shows a kraft pulp mill that is not integrated to manufacturing of microcellulose, i.e. represents the prior-art.

According to the present invention there is provided a process for producing microcellulose comprising i) hydrolyzing fibrous cellulosic material with an acid at an elevated temperature or ii) acidifying fibrous cellulosic material followed by washing and hydrolyzing the washed cellulosic material at an elevated temperature to produce a microcellulose-hydrolysate mixture followed by separation of the microcellulose from the hydrolysate, wherein the mixture or separated hydrolysate or microcellulose is optionally neutralized, and wherein the microcellulose production is integrated to production of a pulp mill such that at least part of chemicals used in the acidification, acid hydrolysis and/or neutralization is produced by an integrated chemical recovery process of the pulp mill.

As used in this specification the term "microcellulose" includes microcrystalline cellulose MCC but refers also to similar products which are not totally crystalline but may contain some amorphous regions. The microcellulose of the present invention typically has a hemicellulose content of about 0 to 10%, preferably 0.5 to 7%, more preferably 1 to 5% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The microcellulose production is preferably integrated to a kraft pulp mill. However, the microcellulose production may also be integrated to other pulp mills, such as soda-AQ pulp, sulfite pulp, neutral sulfite pulp, acid sulfite pulp or organosolv pulp mills.

According to a first embodiment i) of the invention fibrous cellulosic material is hydrolyzed with an acid at an elevated temperature.

The amount of acid in the acid hydrolysis is preferably from 0.2 to 10%, more preferably from 0.2 to 5%, still more preferably from 0.2 to 2%, and most preferably from 0.5 to 1.5% on dry weight of the cellulose.

According to a second embodiment ii) of the invention the fibrous cellulosic material is acidified followed by washing and hydrolyzing the washed cellulosic material at an elevated temperature. The washed cellulosic material may be dewatered before hydrolysis.

This second embodiment ii) is based on the discovery that cellulose fibres that are freed from metals become acidic enough to sustain autohydrolysis wherein the own acidity of cellulose fibres is utilized. Cellulose fibres contain acidic groups that are bound to fibre wall, e.g. uronic acids and lignin-bound ionizable groups. The fibres usually contain metal ions, e.g. $Na^+$, $Ca^{2+}$, $Mg^{2+}$ and $Mn^{2+}$, that neutralize the acidity of fibres. According to the present invention the metals are removed from fibres by acidification and washing. As a result of this ion-exchange treatment, the metals are removed from fibres and the ionized groups in the fibre wall are protonated. For monovalent ions, the ion-exchange can generally be described as follows:

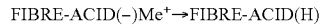

$$FIBRE\text{-}ACID(-)Me^+ \rightarrow FIBRE\text{-}ACID(H)$$

and for divalent metal ions, ion-exchange can generally be described as follows:

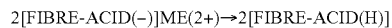

$$2[FIBRE\text{-}ACID(-)]ME(2+) \rightarrow 2[FIBRE\text{-}ACID(H)]$$

As a result of this ion-exchange, the fibres (i.e. cell wall of fibres) become acidic enough to sustain autohydrolysis. The resulting hydrolysis mixture contains microcellulose and fibre-originated reaction products but no metal ions and salts, which makes the further treatment of the microcellulose easier.

In the acidification step of the second embodiment ii) the cellulosic material is preferably acidified to a pH value of 4 or below 4, more preferably 3 or below 3. The pH is preferably 0 or over 0, more preferably 0.5 or over 0.5, still more preferably 1 or over 1. The pH is preferably between 0.5 and 4, more preferably between 1 and 3, and most preferably between 1.5 and 2.5.

In said acidification step the pKa value is preferably lowered to at least 1, preferably at least 1.5, more preferably at least 2 units lower than the pKa value of the acidic groups of the cellulosic fibres, e.g. uronic acids and lignin-bound ionizable groups.

The consistency of the cellulosic material in said acidification step is preferably from 5 to 40%, more preferably from 10 to 30% on dry weight of the cellulosic material.

The temperature in said acidification step is preferably less than 120° C., more preferably between 10 and 90° C., and most preferably between 20 and 70° C.

The residence time in the acidification step is preferably from 10 to 90 minutes, more preferably from 15 to 60 minutes.

After the acidification in the second embodiment ii) the acidified cellulosic material is washed and optionally dewatered. The washing is preferably carried out by dewatering the acidified cellulosic material to remove excess acid followed by diluting the dewatered cellulosic material and then again dewatering the material. The washing procedure can be repeated once or twice. Finally the washed cellulosic material is diluted to target consistency.

Washing can be carried out by utilizing industrial pulp washers normally used in pulp mills. A preferred embodiment comprises acidification in a vessel, followed by acid removal by screw press, followed by dilution with water, and dewatering again.

As set forth above, in the second embodiment ii) the own acidity of the cellulosic material is utilized in the hydrolysis. Thus, it is not necessary to add acid into the hydrolysis step. However, it is possible to add minor amounts of acid into the hydrolysis, preferably at most 0.5%, more preferably at most 0.2%, and most preferably at most 0.18% on dry weight of the cellulose.

Suitable acids for the hydrolysis of the first embodiment i) and for the acidification of the second embodiment ii) are both organic and inorganic acids. The organic acid may be e.g. formic acid or acetic acid. Preferred acids are mineral acids, such as sulphuric acid, sodium bisulphate, sodium bisulfate, hydrochloric acid or nitric acid.

Said acid hydrolysis or acidification may be carried out with sulfuric acid and/or sodium bisulphate and/or sodium bisulfite wherein at least part is produced in the integrated chemical recovery process of pulp mill, preferably a kraft pulp mill.

Said sodium bisulfate may be obtained by converting sulphur dioxide in flue gases of the pulp mill to sodium bisulfite in a bisulfate scrubber and further to sodium bisulfate by means of an oxidant.

Said sodium bisulfite may be obtained by converting sulfur dioxide in flue gases of the pulp mill to sodium bisulfite in a bisulfite scrubber.

Said sulfuric acid may obtained by converting sulfur dioxide in the flue gases of the pulp mill to sulfuric acid.

Thus, the acid used for the acid hydrolysis or the acidification or a part thereof may comprise sodium bisulphate and/or sodium bisulphite and/or sulfuric acid originating from sulphur recovered from the chemical circulation of a pulp mill. The sodium bisulphate may be obtained by oxidizing sodium bisulphite in line with the processes disclosed in WO 2004/088032 and WO 2004/088033 (FI 116074 B). Said sodium bisulphite can be obtained by converting sulphur dioxide in flue gases of the pulp mill to sodium bisulphite in a bisulphite scrubber. Said sodium bisulphate can be obtained by converting sulphur dioxide in flue gases of the pulp mill to sodium bisulphite in a bisulphite scrubber and further to sodium bisulphate by means of oxidant. The sulfur dioxide can be obtained by burning odorous sulfur-containing gases of the pulp mill. Said sulfuric acid can be obtained by converting sulfur dioxide in flue gases to sulfur trioxide and converting to sulfuric acid by reacting with water.

Preferably the neutralization of microcellulose-hydrolysate mixture or hydrolysate or microcellulose is carried out by sodium hydroxide, sodium carbonate, sodium bicarbonate, potassium hydroxide or magnesium hydroxide.

The neutralization of microcellulose-hydrolysate mixture or hydrolysate or microcellulose may be carried out by sodium hydroxide, sodium carbonate or sodium bicarbonate wherein at least part is produced in the integrated chemical recovery process of pulp mill.

The separated hydrolysate or neutralized hydrolysate may be at least partly returned to the integrated chemical recovery process of pulp mill for producing energy.

Preferably the hydrolysis is carried in a reactor without essential compression, the compression ratio of the reactor preferably being below 1.5:1, more preferably below 1.2:1.

The hydrolysis temperature for both said first and second embodiments is preferably at least 80° C., more preferably at least 100° C., still more preferably between 100 and 185° C., even still more preferably between 120 and 180° C., and most preferably between 120 and 160° C. According to another embodiment of the invention the hydrolysis temperature for both said first and second embodiments is preferably at least 125° C., more preferably between 125 and 185° C., still more preferably between 125 and 180° C., and even still more preferably between 125 and 160° C.

The consistency of the cellulosis material during the hydrolysis is preferably from 3 to 50%, more preferably from 8 to 50%, still more preferably from 15 to 50%, even still more preferably from 20 to 50%, and most preferably from 25 to 45% on dry weight of the cellulose.

The hydrolysis time is preferably from 5 to 240 minutes, more preferably from 5 to 180 minutes, even more preferably from 15 to 150 minutes.

Preferably the mechanical energy input during the hydrolysis is provided to ensure even chemical and temperature distribution and without essential mechanical cutting and mechanical defibration of the cellulose matrix, preferably at most 20 kWh per dry ton cellulose, more preferably at most 10 kWh per dry ton cellulose, and most preferably between 1 and 5 kWh per dry ton cellulose.

According to the invention the fibrous cellulosic material and the acid are contacted with each other, preferably by mixing.

The obtained hydrolysate is rich in hemicellulose hydrolysis products, such as xylose and glucose, and can be used for the production of ethanol, chemicals and/or energy.

The obtained microcellulose may be washed, and the washed microcellulose may also need pH adjustment and neutralization.

It has been observed that microcellulose material with an average particle size of about 8-100 μm, preferably 10-60 μm—as determined by the procedure described later on in this specification—can be produced from fibrous cellulosic material by first acidifying the fibrous cellulosic material, then washing the acidified cellulosic material and finally hydrolyzing the washed cellulosic material without a subsequent disintegration step. An essential feature of the present invention is the high consistency of the cellulosic material in the hydrolysis, which preferably is at least 20% on dry weight of the cellulose. The high consistency increases the concentration of the chemicals which has a favourable effect on the reaction speed, and also makes it easier to recover the microcellulose from the reaction mixture. Higher consistency also lowers the heating need.

The fibrous cellulosic material used as a starting material in the process of the present invention may be any cellulosic material that can be hydrolyzed under the specified conditions. The fibrous cellulosic material does not necessarily have to be a pure cellulosic material but it can also contain other components such as hemicelluloses and lignin.

The lignin content of the fibrous cellulosic starting material is preferably at most 5%, more preferably at most 2%, most preferably at most 1%.

The fibrous cellulosic starting material typically has a hemicellulose content of about 3 to 15%, preferably 5 to 10% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The fibre length of the fibrous cellulosic raw material is preferably 5-0.2 mm. For non-wood fibrous cellulosic materials, such as cotton the fibre length may be more than 5 mm.

The fibrous cellulosic material may be derived from wood plant material, such as softwoods or hardwoods.

A preferred fibrous cellulosic material is a bleached or unbleached chemical pulp, such as kraft pulp, soda-AQ pulp, sulfite pulp, neutral sulfite pulp, acid sulfite pulp or an organosolv pulp. The pulp may be softwood or hardwood pulp. The pulp may be a pulp obtained immediately after the digestion or a pulp that has been delignified after the digestion or a pulp that has been delignified and bleached. According to the present invention such pulps are typically not subjected to an alkaline hydrolysis prior to the acid hydrolysis step i) or acidification step ii).

According to the present invention it is also possible to use fibrous cellulosic material obtained from non-wood lignocellulosic plant materials such as cotton, grass, bagasse, straws of grain crops, flax, hemp, sisal, abaca or bamboo. Usually these plant materials are treated with an alkaline substance to break the lignocellulosic material into cellulose, lignin and hemicellulose followed by separating the cellulose from the mixture. Some lignin-poor plant materials, such as cotton linters or cotton textiles do not necessarily require a treatment with an alkaline substance. The latter materials may contain more than 90% cotton fibres of the fibrous material.

The fibrous cellulosic material, such as chemical pulp preferably has a lignin content of below 40 kappa number, more preferably below 30 kappa number, and most preferably below 10 kappa number.

According to a preferred embodiment of the invention the produced microcellulose has a narrow particle size distribution, wherein the average particle size (D50) is 10-60 μm, and preferably the particle size distribution (D90) is such that at least 90% by volume of the particles have a size of below 250 μm, preferably below 100 μm. The particle size was determined by the procedure described later on in this specification which procedure includes ultrasonic treatment which might cause deagglomerization or disintegration of the sample.

The microcellulose material obtained by the process of the invention typically has an average particle size between 8-100 μm, preferably between 10-60 μm—as determined by the procedure described later on in this specification—without any mechanical treatment. It is possible to refine the structure if finer particle size is required. Thus, the microcellulose material obtained from the hydrolysis may, if desired, be refined to a smaller particle size by using suitable devices, such as friction grinders wherein the refining is effected by grinding stones (e.g. Masuko grinder), high shear mixers or jet mills or homogenisers.

A benefit of the process of the invention is that the purity of the final microcellulose is moderately high and that the product can be easily washed to remove low molecular weight carbohydrates. The cellulose purity of washed microcellulose can be even over 97%.

The yield of the microcellulose depends on the conditions of the process, such as temperatures, amount of acid and retention times of the acidification and hydrolysis as well as consistency. A typical yield is at least 80%, preferably at least 85% and the yield may even be 90% or higher.

According to the present invention the microcellulose may be produced in any suitable equipment wherein the cellulose-acid mixture is not subjected to any substantial compression, such as a vessel equipped with a mixer or screw conveyor. The latter one may be a device of the continuous vertical or semivertical, e.g. M&D digesters, vertical screw digester/reactor type having a screw conveyor. The compression ratio, if any, is typically below 1.5:1, more preferably below 1.2:1. Other devices may be continuous bleaching towers or down-flow continuous digesters, e.g. of type Kamyr.

The invention will in the following be described more in detail with reference to the enclosed FIG. 1 and FIG. 2. FIG. 1 shows a kraft pulp mill that is not integrated to manufacturing of microcellulose, i.e. represents the prior-art, and FIG. 2 shows an embodiment of the present invention wherein a kraft pulp mill is integrated to manufacturing of microcelluse.

With reference to FIG. 1 wood chips are cooked in a digester 1. The obtained fibrous cellulosic material is then washed and delignified with oxygen 2 and bleached 3 to produce bleached pulp 4. The fibrous cellulosic material obtained after cooking, washing/delignification or bleaching is fed into a hydrolysis reactor 6 which produces microcellulose in acid hydrolysis reaction by charging fresh sulfuric acid 5 to the fed pulp, i.e. fibrous material, and heating to an elevated temperature. The produced microcellulose-hydrolysate mixture is washed with water and the acid hydrolysate is removed 7 and microcellulose 8 is obtained. The hydrolysate is neutralized 9 with caustic, e.g. in form of sodium hydroxide (NaOH) 10. The dissolved substances of the hydrolysate are e.g. sent to effluent water treatment 11 where the effluent water is purified, and sludge or biogas is produced which then may be used for producing energy. The dissolved substances of the hydrolysate can also be used to produce ethanol 12 or chemicals 13.

In kraft cooking, black liquor is sent to recovery system 14 where chemicals and energy are recovered. The recovery of a softwood mill removes soap, acidifies the soap with at least sulfuric acid and finally produces so-called tall oil 15. Because of unbalance between sodium and sulfur, i.e. excess of sulfur, sulfur in the form of glauber salt ($Na_2SO_4$) 16 is removed. To compensate for sodium losses, fresh caustic (make-up) 17 needs to be added to the recovery cycle. The recovery also produces white liquor (WL) that is used in kraft cooking.

Figure 2:
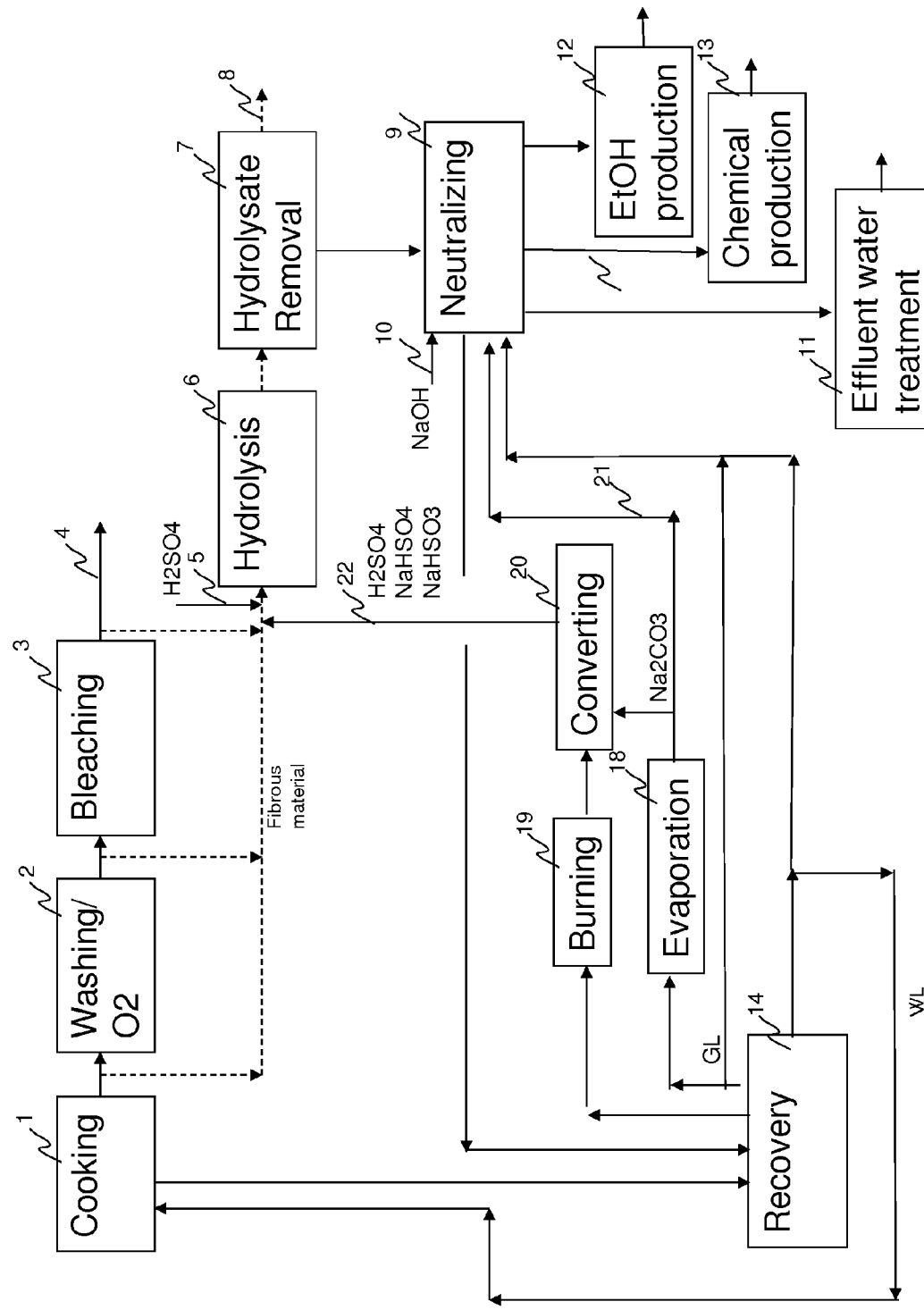
FIG. 2 shows a kraft pulp mill that is integrated to manufacturing of microcellulose according to an embodiment of the present invention.

With reference to FIG. 2 wood chips are cooked in a digester 1. The obtained fibrous cellulosic material is then washed and delignified with oxygen 2 and bleached 3 to produce bleached pulp 4. The fibrous cellulosic material obtained after cooking, washing/delignification or bleaching is fed into a hydrolysis reactor 6 which produces microcellulose. Sodium bisulfite, sodium bisulfate or sulfuric acid 22 produced in conjunction with the kraft pulp mill is charged into the acid hydrolysis reactor 6. These acids, i.e. sodium bisulfite, sodium bisulfate or sulfuric acid 22 are obtained by burning 19 odorous sulfur-containing gases of the pulp mill to obtain sulfur dioxide. Said sulfur dioxide can be converted 20 to sodium bisulfite by absorbing in a sodium bisulfite scrubber. Sodium bisulfate can be made by further reacting the bisulfite with an oxidant. Sulfuric acid can be obtained by converting 20 sulfur dioxide to sulfur trioxide and therefrom to sulfuric acid. Fresh sulfuric acid 5 can, if necessary, also simultaneously be added to the fed pulp, i.e. fibrous material. The pulp is also heated to an elevated temperature. Thus, by this integration, the amount of fresh sulfuric acid used in hydrolysis can be omitted or is low. Simultaneously, excess sulfur in the kraft pulp mill can be led to the hydrolysis in the form of either sulfuric acid, sodium bisulfate or sodium bisulfite. For the kraft pulp mill, this means that less sodium is lost compared to the process shown in FIG. 1. This means that the feed of fresh caustic can be lowered in the kraft pulps as the microcellulose production utilizes acids in the form of sulfur delivered from the kraft pulp mill.

The produced microcellulose is washed with water and the acid hydrolysate is removed 7 and microcellulose 8 is obtained. The hydrolysate is neutralized with caustic, e.g. in form of fresh sodium hydroxide 10 or integrated sodium in the form of sodium carbonate 21 from the recovery system 14. The dissolved substances of the hydrolysate are e.g. sent to effluent treatment 11 where the effluent water is purified. The dissolved substances of the hydrolysate can also be used to produce ethanol 12 or chemicals 13. The hydrolysate can also be led to the recovery 14 of the kraft pulp mill. Thereby, the energy content of the dissolved substances in the hydrolysate can be utilized.

The final impact on the chemical balance between the kraft pulp mill and the microcellulose production depends on wood raw material that is used in the pulp mill and how the hydrolysate is treated. E.g. in the case of softwood and utilizing the hydrolysate to produce ethanol, both the fresh acid demand in the microcellulose manufacturing as well as the excess of sulfur in the kraft pulp mill can be improved.

On the other hand, e.g. if the raw material is sodium containing wood, the kraft pulp mill recovery will have excess of sodium. In such a case, sodium can be led to the microcellulose manufacturing in the form of sodium carbonate 21. The sodium carbonate can e.g. be obtained by crystallizing green liquor (GL) by evaporation 18. Thereby, the use of fresh caustic 10 in neutralization of hydrolysate can be lowered or eliminated. As well, the excess of sodium in the kraft pulp mill recovery cycle would be improved.

In addition, the integrated production may have shared utilities e.g. steam production, raw water treatment and effluent treatment.

EXPERIMENTAL SECTION

The following examples to produce microcellulose describe in more detail the procedure according to invention. The cooking experiments were done with an airbath-digester, manufactured by Haato Oy. The air-bath-digester consists of six separate autoclave units, which all have a volume of 2.5 liter. The units are heated with hot air. Air is heated with an electric resistor and the heated air is circulated with a fan.

All of the cooking experiments were done in the following manner. The cellulose material, pulp or other, was put in an autoclave unit. Pulp in bale sheets was cut in square pieces with edge of about 1-2 cm prior to loading to autoclave unit. Fresh cellulose material, e.g. unbleached pulp, was dried to consistency of 45-50% and then homogenized with Kenwood household mixer for 5 min, prior to loading into autoclave unit. Acid solution was dosed after cellulose material. Acid was first pre-mixed with de-ionized water and the aqueous acid solution was poured evenly on the pulp. The lid of the autoclave unit was closed and the unit was heated to 80° C.

The pre-heating stage took about 20 min in each test. When 80° C. start temperature had been reached, the real heating stage started. The autoclave unit was heated in a controlled manner with heating speed of 2° C./min until the cooking temperature target had been reached. Thus heating e.g. to 160° C. took 40 min and to 175° C. took 47.5 min. Cooking time started, when the target cooking temperature had been reached. Temperature was kept at the target temperature value during the whole cooking time. When cooking time was completed, the autoclave unit was immediately removed and cooled with cold water (temperature about 10° C.).

Cooled autoclave unit was opened and the cellulose mixture was put into a filter bag (mesh 90). The excess acid solution in the mixture was removed with a spin dryer (Manufacturer UPO. Drying time 2 min, speed about 2800 rpm). Consistency after spin dryer treatment was 45-50%. The cellulose material was then washed with 3 liter of de-ionized water, by first mixing the mixture gently for 5 min and drying the mixture with spin dryer to consistency of 45-50%. The washing step with de-ionized water was repeated two times. pH in the last (third) aqueous mixture was about 6-7 and washing was considered to be complete.

The washed cellulose material was weighed. Three samples, each about 20 g were taken, combined and weighted. The combined samples were dried in an oven (105° C., 24 h). Using the moisture value of the sample the total amount of dry (absolute) cellulose material was calculated. Process yield was calculated using the amount of dry cellulose material of the washed product and the dry cellulose material in the start.

Particle sizes of the cellulose products were determined by laser diffraction with Mastersizer 2000 (made by Malvern Instruments Ltd) equipped with a wet dispersion unit Hydro 2000MU. The determinations were done according to the following procedure:

A sample of the cellulosic material was dispersed in 500 ml of distilled water. The sample concentration was adjusted in a manner that the obscuration was 10%. Pump/stir rate of the dispersion unit was adjusted to 1500 rpm. The sample was treated with ultrasonic for 60 sec prior to the particle size measurement. Particle sizes were measured in 3 sequential measurements in 60 sec intervals. The average value of three measurements was calculated. Background was measured each time prior to the sample. The measuring time for each background and each sample measurements was 5 sec. The measurements were done using Fraunhofer parameters. More data for laser diffraction measurement principles are presented in Master sizer 2000 application note MRK 561 (Wet method development for laser diffraction measurements) by Malvern Instruments and ISO-13320-1 (1:1999), Particle size analysis—Laser diffraction General Principles.

Example 1

Acid Hydrolysis of Fully Bleached Pulp, Acid Dosage 0.5% (of Dry Pulp), Cooking Temperature 160° C.

A series of hydrolysis experiments were done with fully bleached softwood pulp. The pulp was in bale sheets (dry substances 92.4%). The procedure of the experiment 1-1 is described below. All of the experiments were done in the similar manner.

Pulp pieces 324.7 g (bale sheets, dry substances 92.4%, dry pulp 300 g) were put into an autoclave unit of an air-bath-digester. Sulphuric acid 15.3 ml (conc. 1 mole/liter, absolute sulphuric acid amount 1.50 g) and water 660 ml was pre-mixed and added on the pulp pieces. Consistency of the mixture was 30%. Sulphuric acid dosage of the pulp (absolute acid of dry pulp) was 0.5%.

The autoclave unit was closed and heating was started. The digester was first heated up to 80° C. in 20 min and then heating stage was started. The mixture was heated with a speed of 2° C./min to 160° C. When temperature has reached 160° C., the cooking time was started. After 30 min cooking, the autoclave unit was removed immediately and cooled in a water bath. Temperature of the water bath was 10° C. The reaction product was transferred from the autoclave unit into a filter-bag (mesh 90) and dried with a spin dryer (Manufacturer UPO. Drying time 2 min, speed about 2800 rpm) and washed according to above-mentioned washing procedure. The amount of washed material was 573.3 g. Consistency of the material was 47.2%. The amount of dry material was 270.6 g and process yield thus 90.2%. The parameters and the results of example 1 are presented in table 1.

TABLE 1

| Exp. | Sulphuric acid dosage (%) | Cooking time (min) | Reaction temperature (° C.) | Consistency (%) | Yield (%) | Average particle size (μm) |
|---|---|---|---|---|---|---|
| 1-1 | 0.5 | 30 | 160 | 30 | 90 | 24 |
| 1-2 | 0.5 | 90 | 160 | 30 | 87 | 21 |
| 1-3 | 0.5 | 150 | 160 | 30 | 83 | 18 |

Figure 3:
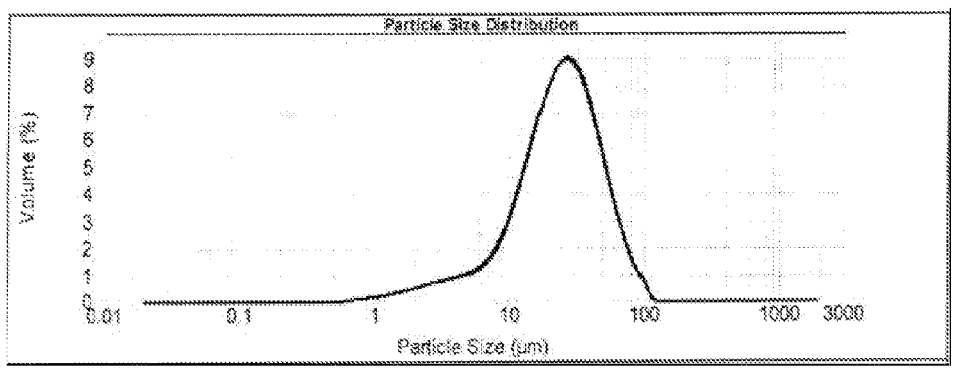
FIG. 3 shows the particle size distribution curve of microcellulose produced according to the present invention at 160° C. and acid dose of 0.5%.

Particle size distribution was determined with Malvern Mastersizer 2000, using the dispersion unit Hydro 2000 MU. The particle size distribution curve of experiment 1-1 is presented in FIG. 3.

The results of the experiments in example 1 show that hydrolysis with low acid concentration at 160° C. yields good quality homogenous microcellulose with average particle size of about 20 μm without any mechanical treatment. The yield is good with cooking time of 90 min or below and starts to decrease slightly with cooking time above 90 min.

Example 2

Acid Hydrolysis of Fully Bleached Pulp, Acid Dosage 1.5%, Cooking Temperature of 160° C.

A series of hydrolysis experiments was done with fully bleached softwood pulp, moisture 10%. The parameters and the results of example 2 are presented in table 2.

TABLE 2

| Exp. | Sulphuric acid dosage (%) | Cooking time (min) | Reaction temperature (° C.) | Consistency (%) | Yield (%) | Average particle size (μm) |
|---|---|---|---|---|---|---|
| 2-1 | 1.5 | 30 | 160 | 30 | 85 | 18 |
| 2-2 | 1.5 | 90 | 160 | 30 | 82 | 19 |
| 2-3 | 1.5 | 150 | 160 | 30 | 78 | 16 |

Particle size distribution curves were similar to those of example 1. The results show that microcellulose with average particle size below 20 μm can be produced without the need of mechanical treatment. The results show that with increased cooking time particle size decreases slightly but yield significantly. Compared to example 1, the average particle sizes are lower, but yields are also lower.

Example 3

Acid Hydrolysis of Fully Bleached Pulp, Acid Dosage 0.5%, Cooking Temperature 175° C.

Figure 4:
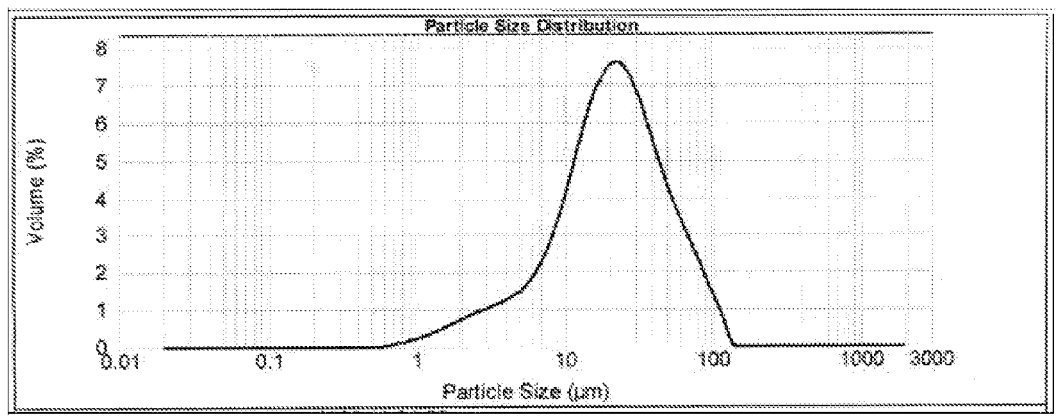
FIG. 4 shows the particle size distribution curve of microcellulose produced according to the present invention at 175° C. and acid dose of 0.5%.

A series of hydrolysis experiments was done with fully bleached softwood pulp, moisture 10%. The parameters and the results of example 3 are presented in table 3. Particle size distribution curve of Experiment 3-1 is presented in FIG. 4.

TABLE 3

| Exp. | Sulphuric acid dosage (%) | Cooking time (min) | Temperature (° C.) | Consistency (%) | Yield (%) | Average particle size (μm) |
|---|---|---|---|---|---|---|
| 3-1 | 0.5 | 15 | 175 | 30 | 86 | 21 |
| 3-2 | 0.5 | 30 | 175 | 30 | 86 | 20 |
| 3-3 | 0.5 | 90 | 175 | 30 | 76 | 18 |

The results in table 3 show that microcellulose with average particle size of approximately 20 μm can be produced with good yield with cooking time of 30 min or less. Decreased process yield was observed with cooking time of 90 min.

Example 4

Acid Hydrolysis of Fully Bleached Pulp, Acid Dosage 1.5%, Cooking Temperature 175° C.

A series of hydrolysis experiments was done with fully bleached softwood pulp, moisture 10%. The parameters and the results of example 4 are presented in table 4.

TABLE 4

| Exp. | Sulphuric acid dosage (%) | Cooking time (min) | Temperature (° C.) | Consistency (%) | Yield (%) | Average particle size (μm) |
|---|---|---|---|---|---|---|
| 4-1 | 1.5 | 15 | 175 | 30 | 80 | 19 |
| 4-2 | 1.5 | 30 | 175 | 30 | 77 | 19 |
| 4-3 | 1.5 | 90 | 175 | 30 | 71 | 17 |

The results show that good quality microcellulose with particle size below 20 μm can be produced in cooking time of 15 min. The process yield starts to decrease in a function of reaction time. Short reaction times are beneficial at high cooking temperatures.

Example 5

Acid Hydrolysis of Fully Bleached Pulp, Cooking Time 90 min, Cooking Temperature 140° C.

Figure 5:
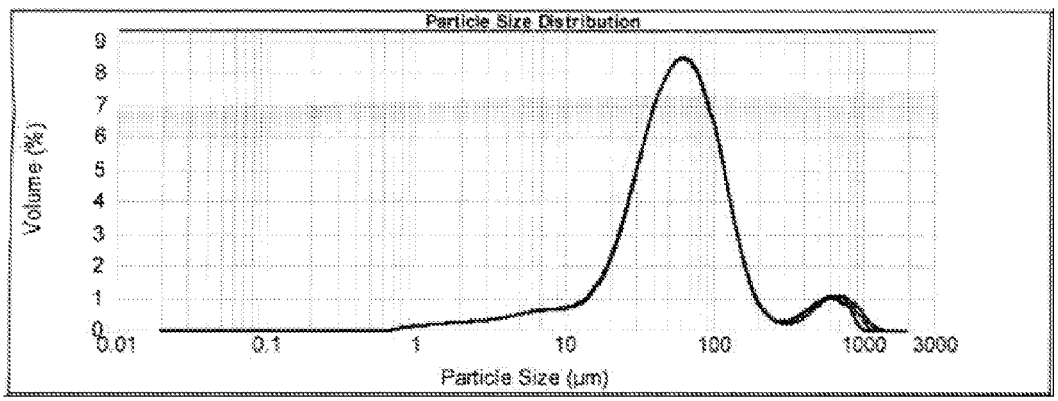
FIG. 5 shows the particle size distribution curve of microcellulose produced according to the present invention at 140° C. and acid dose of 0.5%.
Figure 6:
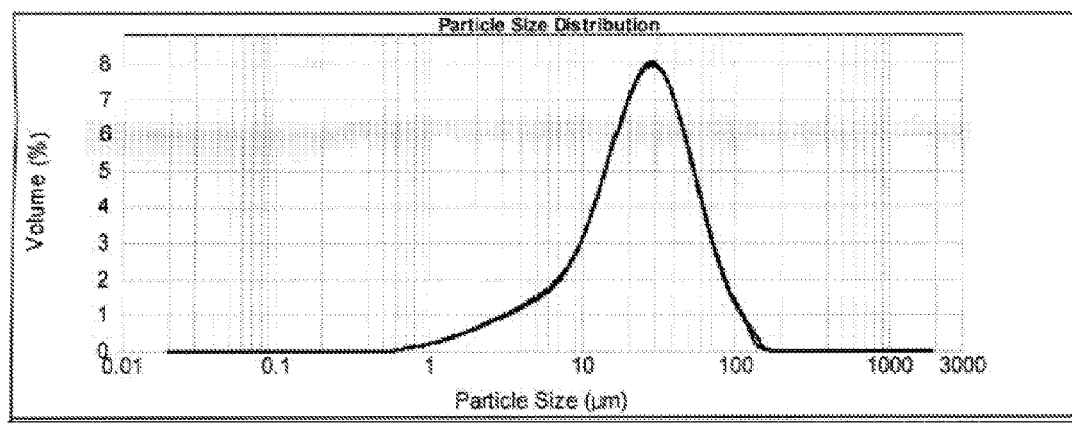
FIG. 6 shows the particle size distribution curve of microcellulose produced according to the present invention at 140° C. and acid dose of 1.5%.

A couple of hydrolysis experiments were done with fully bleached softwood pulp (moisture 10%). The parameters and the results of example 5 are presented in table 5. Particle size distribution curve of Experiment 5-1 is presented in FIG. 5 and curve of Experiment 5-2 is presented in the FIG. 6.

TABLE 5

| Exp. | Sulphuric acid dosage (%) | Cooking time (min) | Temperature (° C.) | Consistency (%) | Yield (%) | Average particle size (μm) |
|---|---|---|---|---|---|---|
| 5-1 | 0.5 | 90 | 140 | 30 | 92 | 50 |
| 5-2 | 1.5 | 90 | 140 | 30 | 89 | 30 |

The results show that at temperature of 140° C. sulphuric acid concentration of 1.5 is enough for good quality microcellulose with good process yield. Process yield is good with acid concentration of 0.5%, but particle size distribution curve of Exp 5-1 shows that there is a population of particles, with diameter above 100 μm present in the product.

Example 6

Acid Hydrolysis of Unbleached Pine Pulp, Acid Dosage 0.5%, Temperature 160° C.

A series of hydrolysis experiments were done with softwood pulp after cooking stage. The parameters and the results of example 6 are presented in table 6.

TABLE 6

| Exp. | Sulphuric acid dosage (%) | Cooking time (min) | Temperature (° C.) | Consistency (%) | Yield (%) | Average particle size (μm) |
|---|---|---|---|---|---|---|
| 6-1 | 0.5 | 30 | 160 | 30 | 93 | 40 |
| 6-2 | 0.5 | 90 | 160 | 30 | 89 | 32 |
| 6-3 | 0.5 | 150 | 160 | 30 | 83 | 21 |

The results show that high quality microcellulose can be produced using fresh pine pulp as a raw material. Process yield is good in the Experiments 6-1 and 6-2 and moderate in the Experiment 6-3. The average particle size is the lowest in Experiments 6-3.

Example 7

Acid Hydrolysis of Unbleached Softwood Pulp, Acid Dosage 1.5%, Cooking Time 30 min A couple of hydrolysis experiments were done with unbleached softwood pulp. The parameters and the results of example 7 are presented in table 7.

TABLE 7

| Exp. | Sulphuric acid dosage (%) | Cooking time (min) | Temperature (° C.) | Consistency (%) | Yield (%) |
|---|---|---|---|---|---|
| 7-1 | 1.5 | 30 | 160 | 30 | 91 |
| 7-2 | 1.5 | 30 | 175 | 30 | 85 |

The results show that unbleached softwood pulp is suitable raw material for the production of microcellulose. Cooking time of 30 min is sufficient.

Example 8

Acid Hydrolysis of Fully Bleached Pulp, Temperature 120° C.

Figure 7:
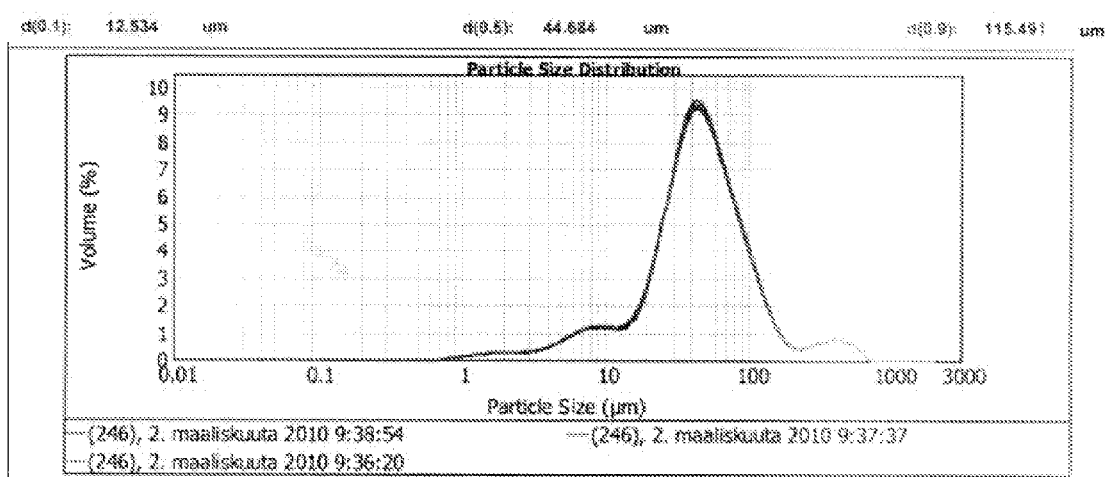
FIG. 7 shows the particle size distribution curve of microcellulose produced at 120° C. and acid dose of 1.5%.

A series of hydrolysis experiments was done with fully bleached softwood pulp (moisture 10%). The parameters and the results of example 8 are presented in table 8. Particle size distribution of the experiment 8-5 is in FIG. 7.

TABLE 8

| Exp. | Sulphuric acid dosage (%) | Cooking time (min) | Temperature (° C.) | Consistency (%) | Yield (%) | Average particle size (μm) | Particle size, 90% (μm) |
|---|---|---|---|---|---|---|---|
| 8-1 | 1.5 | 150 | 120 | 20 | 97 | 56 | 164 |
| 8-2 | 2.0 | 150 | 120 | 20 | 97 | 49 | 134 |
| 8-3 | 1.5 | 90 | 120 | 30 | 97 | 55 | 154 |
| 8-4 | 2.0 | 90 | 120 | 30 | 97 | 44 | 112 |
| 8-5 | 1.5 | 150 | 120 | 30 | 96 | 45 | 115 |
| 8-6 | 2.0 | 150 | 120 | 30 | 91 | 41 | 102 |

The results show that when pulp is cooked at 120° C. even for long times, the yield of the microcellulose is very good, over 90%. For certain microcellulose applications the obtained product can be used without refining. Over 10% of the particles have particle size over 100 μm and thus for certain microcellulose applications refining might be necessary.

The invention claimed is:

1. A process for producing microcellulose comprising
   i) hydrolyzing fibrous cellulosic material comprising bleached or unbleached pulp made from softwoods or hardwoods with an acid comprising sodium bisulphate and/or sodium bisulfite at an elevated temperature, wherein the amount of acid is from 0.2 to 2% on dry weight of the cellulose, or
   ii) acidifying fibrous cellulosic material comprising bleached or unbleached pulp made from softwoods or hardwoods with an acid comprising sodium bisulphate and/or sodium bisulfite followed by washing and hydrolyzing the washed cellulosic material at an elevated temperature, to produce a microcellulose-hydrolysate mixture followed by separation of the microcellulose from the hydrolysate, wherein the mixture or separated hydrolysate or microcellulose is optionally neutralized, and wherein the microcellulose production is integrated to production of a pulp mill such that at least part of the sodium bisulphate and/or sodium bisulfite used in the acidification and/or acid hydrolysis or at least part of the sodium bisulphate and/or sodium bisulfite used in the acidification and/or acid hydrolysis and chemicals used in the neutralization are produced by an integrated chemical recovery process of the pulp mill, wherein the hydrolysis is carried out in a continuous bleaching tower, and wherein the produced microcellulose having an average particle size of 8-100 μm is obtained without a mechanical treatment.

2. The process according to claim 1, wherein the cellulosic material is acidified in step ii) to a pH value of 4 or below 4.

3. The process according to claim 1, wherein the sodium bisulfate is obtained by converting sulphur dioxide in flue gases of the pulp mill to sodium bisulfite in a bisulfite scrubber and further to sodium bisulfate by means of an oxidant.

4. The process according to claim 1, wherein the sodium bisulfite is obtained by converting sulfur dioxide in flue gases of the pulp mill to sodium bisulfite in a bisulfite scrubber.

5. The process according to claim 1 wherein the neutralization of microcellulose-hydrolysate mixture or hydrolysate or microcellulose is carried out by sodium hydroxide, sodium carbonate, sodium bicarbonate, potassium hydroxide or magnesium hydroxide.

6. The process according to claim 1, wherein the neutralization of microcellulose-hydrolysate mixture or hydrolysate or microcellulose is carried out by sodium carbonate or sodium bicarbonate wherein at least part is produced in the integrated chemical recovery process of pulp mill.

7. The process according to claim 1, wherein separated hydrolysate or neutralized hydrolysate is at least partly returned to the integrated chemical recovery process of pulp mill for producing energy.

8. The process according to claim 1, wherein the hydrolysis takes place at a temperature of at least 80° C.

9. The process according to claim 1, wherein the consistency of the cellulose in the hydrolysis is from 3 to 50% on dry weight of the cellulose.

10. The process according to claim 1, wherein the hydrolysis time is from 5 to 240 minutes.

11. The process according to claim 1, wherein mechanical energy input during the hydrolysis is carried out to ensure even chemical and temperature distribution and without mechanical cutting, and defibration of the cellulose matrix, at most 20 kWh per dry ton cellulose.

12. The process according to claim 1, wherein the fibrous cellulosic material and the acid are mixed with each other.

13. The process according to claim 1, wherein the fibrous cellulosic material has a lignin content of below 100 kappa number.

14. The process according to claim 1, wherein the amount of acid in the acid hydrolysis i) is from 0.5 to 1.5% on dry weight of the cellulose.

15. The process according to claim 1, wherein the cellulosic material is acidified in step ii) to a pH value of 3 or below 3.

16. The process according to claim 1, wherein the cellulosic material is acidified in step ii) to a pH value between 1.5 and 2.5.

17. The process according to claim 1 wherein the acid hydrolysis or acidification is carried out with sulphuric acid, sodium bisulphate, sodium bisulfite, hydrochloric acid or nitric acid.

18. The process according to claim 1, wherein the acid hydrolysis or acidification is carried out with sodium bisulphate and/or sodium bisulfite wherein at least part is produced in the integrated chemical recovery process of a kraft pulp mill.

19. The process according to claim 1, wherein the hydrolysis takes place at a temperature of at least 100° C.

20. The process according to claim 1, wherein the hydrolysis takes place at a temperature between 100 and 185° C.

21. The process according to claim 1, wherein the hydrolysis takes place at a temperature between 120 and 180° C.

22. The process according to claim 1, wherein the hydrolysis takes place at a temperature between 120 and 160° C.

23. The process according to claim 1, wherein the consistency of the cellulose in the hydrolysis is from 8 to 50% on dry weight of the cellulose.

24. The process according to claim 1, wherein the consistency of the cellulose in the hydrolysis is from 15 to 50% on dry weight of the cellulose.

25. The process according to claim 1, wherein the consistency of the cellulose in the hydrolysis is from 20 to 50% on dry weight of the cellulose.

26. The process according to claim 1, wherein the consistency of the cellulose in the hydrolysis is from 25 to 45% on dry weight of the cellulose.

27. The process according to claim 1, wherein the hydrolysis time is from 5 to 180 minutes.

28. The process according to claim 1, wherein the hydrolysis time is from 15 to 150 minutes.

29. The process according to claim 1, wherein mechanical energy input during the hydrolysis is carried out to ensure even chemical and temperature distribution and without mechanical cutting and defibration of the cellulose matrix at most 10 kWh per dry ton cellulose.

30. The process according to claim 1, wherein mechanical energy input during the hydrolysis is carried out to ensure even chemical and temperature distribution and without mechanical cutting and defibration of the cellulose matrix between 1 and 5 kWh per dry ton cellulose.

31. The process according to claim 1, wherein the fibrous cellulosic material comprises kraft pulp, soda-AQ pulp, sulfite pulp, neutral sulfite pulp, acid sulfite pulp or organosolv pulp.

32. The process according to claim 1, wherein the fibrous cellulosic material is kraft pulp.

33. The process according to claim 1, wherein the fibrous cellulosic material has a lignin content of below 40 kappa number.

34. The process according to claim 1, wherein the fibrous cellulosic material has a lignin content of below 30 kappa number.

35. The process according to claim 1, wherein the fibrous cellulosic material has a lignin content of below 10 kappa number.

36. The process according to claim 1, wherein the produced microcellulose has an average particle size of 10-60 µm.

37. The process according to claim 1, wherein the produced microcellulose has particle size distribution at least 90% by volume of the particles have a size of below 100 µm.

* * * * *